United States Patent [19]

Brosius et al.

[11] Patent Number: 5,384,369
[45] Date of Patent: Jan. 24, 1995

[54] PARTIALLY CROSSLINKED COMPOSITION COMPRISING POLYMERS OF PROPYLENE AND OF ETHYLENE

[75] Inventors: Sibylle Brosius; Erhard Seiler, both of Ludwigshafen; Harald Schwager, Speyer; Gerhard Kress, Ludwigshafen; Lothar Schlemmer, Maxdorf, all of Germany

[73] Assignee: BASF Aktiengesellschaft, Ludwigshafen, Germany

[21] Appl. No.: 238,791

[22] Filed: May 6, 1994

Related U.S. Application Data

[63] Continuation of Ser. No. 847,121, Mar. 6, 1992, abandoned.

[30] Foreign Application Priority Data

Mar. 9, 1991 [DE] Germany .............................. 4107665

[51] Int. Cl.$^6$ ................................................ C08L 23/26
[52] U.S. Cl. ........................................ 525/193; 525/88
[58] Field of Search ................................ 525/193, 88

[56] References Cited

U.S. PATENT DOCUMENTS

| | | | |
|---|---|---|---|
| 3,646,155 | 2/1972 | Scott | 260/827 |
| 4,160,072 | 7/1979 | Shinkai et al. | 521/86 |
| 4,558,094 | 12/1985 | Deguchi et al. | 525/71 |
| 4,618,654 | 10/1986 | Schmidtchen et al. | 525/193 |
| 4,652,326 | 3/1987 | Spielau et al. | 525/288 |
| 4,871,813 | 10/1989 | Senez | 525/240 |
| 4,985,502 | 1/1991 | Igumi et al. | 525/193 |
| 5,244,976 | 9/1993 | Brosius et al. | 525/193 |

FOREIGN PATENT DOCUMENTS

| | | |
|---|---|---|
| 412518 | 2/1991 | European Pat. Off. . |
| 2611491 | 4/1979 | Germany . |
| 3520106 | 12/1986 | Germany . |
| 63088707 | 4/1988 | Japan . |
| 1406680 | 9/1975 | United Kingdom . |
| 1408154 | 10/1975 | United Kingdom . |

OTHER PUBLICATIONS

Package Engineering—New Polyethylenes—Feb. 1980 pp. 39–40.
Plastics World—New Materials—Dec. 1979—p. 86.

*Primary Examiner*—Carman J. Seccuro, Jr.
*Attorney, Agent, or Firm*—Keil & Weinkauf

[57] ABSTRACT

A partially crosslinked polymer composition comprising a) a polymer comprising from 25 to 95% by weight of polypropylene and from 5 to 75% by weight of a propylene copolymer with copolymerized $C_2$–$C_{10}$-alk-1-enes, the comonomer content being from 1 to 45% by weight, based on the total polymer, b) a random ethylene copolymer containing from 5 to 20% by weight of copolymerized $C_3$–$C_{10}$-alk-1-enes and having a density at room temperature of from 0.89 to 0.925 g/cm$^3$, and c) an organosilane compound of the formula (I)

$$A_{4-n}SiR_n \qquad (I)$$

where A are identical or different acrylates or methacrylates or vinyl groups, R are identical or different $C_1$–$C_8$-alkoxy or $C_1$–$C_8$-acetoxy groups, and n is 1, 2 or 3, can be obtained by reacting a polymer mixture of the polymer a) and the random ethylene copolymer b) with the organosilane compound c) in the presence of a free-radical initiator and in the presence of a condensation catalyst at from 180° to 280° C., at from 1 to 100 bar and at a mean residence time of the reaction mixture of from 0.2 to 10 minutes.

7 Claims, No Drawings

PARTIALLY CROSSLINKED COMPOSITION COMPRISING POLYMERS OF PROPYLENE AND OF ETHYLENE

This application is a cotinuation of application Ser. No. 07/847,121, filed on Mar. 6, 1992, now abandoned.

The present invention relates to a partially crosslinked composition comprising polymers of propylene and of ethylene, comprising a) a polymer comprising from 25 to 95% by weight of polypropylene and from 5 to 75% by weight of a propylene copolymer with copolymerized $C_2-C_{10}$-alk-1-enes, the comonomer content being from 1 to 45% by weight, based on the total polymer, b) a random ethylene copolymer containing from 5 to 20% by weight of copolymerized $C_3-C_{10}$-alk-1-enes and having a density at room temperature of from 0.89 to 0.925 g/cm$^3$, and c) an organosilane compound of the formula (I)

$$A_{4-n}SiR_n \quad (I)$$

where A are identical or different acrylates or methacrylates or vinyl groups, R are identical or different $C_1-C_8$-alkoxy or $C_1-C_8$-acetoxy groups, and n is 1, 2 or 3, and obtainable by reacting a polymer mixture of the polymer a) and the random ethylene copolymer b) with the organosilane compound c) in the presence of a free-radical initiator and in the presence of a condensation catalyst at from 180° to 280° C., at from 1 to 100 bar and at a mean residence time of the reaction mixture of from 0.2 to 10 minutes.

The present invention furthermore relates to the use of a partially crosslinked polymer composition according to the invention for the production of films and moldings.

It is known to first graft polyethylenes and copolymers of ethylene with vinylsilanes and subsequently to crosslink the graft polymer with the aid of a silanol condensation catalyst (DE-A 26 11 491, U.S. Pat. No. 3,646,155, GB-A 1,406,680 and GB-A 1,408,154). In this way, polymers having improved mechanical properties, in particular higher strength, are obtained.

Furthermore, the crosslinking of polypropylene or copolymers of propylene with unsaturated silanes in the presence of a silanol condensation catalyst and in the presence of a peroxide is described in DE-A 33 27 149 and DE-A 35 20 106. The resultant polymers have good low-temperature toughness and high dimensional stability.

Crosslinked polymers have the advantage over uncrosslinked polymers of higher mechanical stability. However, the low melt flow of crosslinked materials means that they cannot be molded by the methods which are usual in plastics technology (H. G. Elias, Makromoleküle, Verlag Hüthig & Wepf, 4th Edition, pages 1000-1003).

For the processing of polymers, it is therefore necessary to ensure that the degree of crosslinking of the polymers is not too high, so that they can still be molded using the equipment which is customary in plastics technology.

One way of combining good properties with respect to stability to shape changes and mechanical load and resistance to chemicals on the one hand and easy processability on the other hand is to modify plastics using low-molecular-weight plasticizers. These plasticizers are used, in particular, to improve the processing properties of polyvinyl chloride. However, problems frequently occur with respect to the stability of these plasticizers since they often migrate out of the polymer again, so that the plasticizer effect is in some cases considerably reduced after some time. Plasticizers are frequently toxicologically unacceptable, which also means that their use in the foodstuffs and hygiene sectors is limited.

It is an object of the present invention to develop a polymer composition which combines the advantages of crosslinked polymers with respect to their mechanical strength with those of uncrosslinked polymers with respect to their good processing properties and which can in addition be prepared in a simple manner without addition of low-molecular-weight plasticizers.

We have found that this object is achieved by the partially crosslinked polymer compositions defined at the outset.

The polymer compositions according to the invention contain a polymer a) comprising from 25 to 95% by weight of polypropylene and from 5 to 75% by weight of a propylene copolymer with copolymerized $C_2-C_{10}$-alk-1-enes, the comonomer content being from 1 to 45% by weight, based on the total polymer. Preferred polymer compositions are those in which polymer a) comprises from 50 to 90% by weight of polypropylene and from 10 to 50% by weight of a propylene copolymer, the content of copolymerized $C_2-C_{10}$-alk-1-enes being from 2 to 35% by weight, based on the total polymer. For the purposes of the present invention, copolymerized $C_2-C_{10}$-alk-1-enes are, in particular, ethylene, but-1-ene, pent-1-ene, hex-1-ene, hept-1-ene and oct-1-ene or mixtures of these comonomers, preference being given to ethylene and but-1-ene.

The preparation of the polymer a) to be used according to the invention can be carried out in conventional reactors used for the polymerization of propylene, either batchwise or preferably continuously. Examples of suitable reactors are continuously operated stirred reactors, it also being possible to employ a series of consecutive stirred reactors. The reactors contain a fixed bed of finely divided polymer which is usually kept in motion by stirring.

The process can be carried out using the Ziegler-Natta catalysts which are usual in polymerization technology, either in the gas phase or in solution or in a slurry. The Ziegler-Natta catalysts contain, inter alia, cocatalysts in addition to a titanium-containing solid component. Suitable cocatalysts are aluminum compounds together with electron-donor compounds.

The titanium-containing solid component is generally prepared using, as the titanium compound, a halide or alkoxide of trivalent or tetravalent titanium, preference being given to titanium chlorides, in particular titanium tetrachloride. The titanium-containing solid component advantageously contains a finely divided carrier, for which purpose silica, alumina and aluminum silicates of the empirical formula $SiO_2.aAl_2O_3$ where a is from 0.001 to 2, in particular from 0.01 to 0.5, have proven suitable.

The preferred carriers have a particle diameter of from 0.1 to 1,000 μm, in particular from 10 to 300 μm, a pore volume of from 0.1 to 10 cm$^3$/g, in particular from 1.0 to 5.0 cm$^3$/g, and a specific surface area of from 10 to 1,000 m$^2$/g, in particular from 100 to 500 m$^2$/g.

The preparation of the titanium-containing solid component is also carried out using, inter alia, compounds of magnesium, in particular magnesium halides and alkylmagnesium, arylmagnesium compounds, alkoxymagnesium and aryloxymagnesium compounds, preferably magnesium dichloride, magnesium dibromide and di(C$_1$-C$_{10}$-alkyl)magnesium compounds. In addition, the titanium-containing solid component may also contain halogen, preferably chlorine or bromine.

Furthermore, the titanium-containing solid component also contains electron-donor compounds, for example monofunctional or polyfunctional carboxylic acids, carboxylic anhydrides and carboxylic esters, furthermore ketones, ethers, alcohols, lactones, and organophosphorus and organosilicon compounds. Preferred electron-donor compounds within the titanium-containing solid component are phthalic acid derivatives of the general formula II

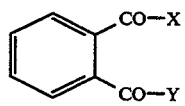  II where X and Y are each chlorine or C$_1$- to C$_{10}$-alkoxy or together are oxygen. Particularly preferred electron-donor compounds are phthalic esters, where X and Y are C$_1$-C$_8$-alkoxy, for example methoxy, ethoxy, propoxy or butoxy.

Other preferred electron-donor compounds within the titanium-containing solid component are, inter alia, diesters of 3- or 4-membered, substituted or unsubstituted cycloalkyl-1,2-dicarboxylic acids, and monoesters of substituted or unsubstituted benzophenone-2-carboxylic acids. The hydroxyl compounds used in these esters are alcohols which are customary in esterification reactions, inter alia C$_1$- to C$_{15}$-alkanols, C$_5$- to C$_7$-cycloalkanols which can themselves carry C$_1$- to C$_{10}$-alkyl groups, and furthermore phenols, naphthols and the C$_1$-C$_{10}$-alkyl derivatives of these compounds.

The titanium-containing solid component can be prepared by conventional methods, for example as described, inter alia, in EP-A 45 975, EP-A 86 473, EP-A 171 200, GB-A 2,111,066 and U.S. Pat. No. 4,857,613.

The titanium-containing solid component is preferably prepared by the three-step process described below.

In the first step, a solution of the magnesium-containing compound in a liquid alkane is first added to a finely divided carrier, preferably silica or SiO$_2$.aAl$_2$O$_3$ having a water content of from 0.5 to 5% by weight, where a is from 0.001 to 2, in particular from 0.01 to 0.5, and this mixture is then stirred for from 0.5 to 5 hours at from 10° to 120° C.

From 0.1 to 1 mol of the magnesium compound is preferably employed per mole of the carrier. A halogen or a hydrogen halide, in particular chlorine or hydrogen chloride, in a two-fold, preferably five-fold, molar excess or more, based on the magnesium-containing compound, is then added with constant stirring. After from about 30 to 120 minutes, the solid is separated from the liquid phase.

In the second step, the product obtained in this way is introduced into a liquid alkane, and a C$_1$- to C$_8$-alkanol, in particular ethanol, a halide or an alkoxide of trivalent or tetravalent titanium, in particular titanium tetrachloride, and an electron-donor compound, in particular a phthalic acid derivative of the formula II, are then added. From 1 to 5 mol, in particular from 2 to 4 mol, of alkanol, from 2 to 20 mol, in particular from 4 to 10 mol, of trivalent or tetravalent titanium and from 0.01 to 1 mol, in particular from 0.1 to 1.0 mol, of the electron-donor compound are employed per mole of magnesium in the solid obtained from the first step. This mixture is stirred for one hour or more at from 10° to 150° C., and the resultant solid is subsequently filtered off and washed with a liquid alkane, preferably hexane or heptane.

In the third step, the solid obtained from the second step is extracted for a few hours at from 100° to 150° C. with excess titanium tetrachloride or an excess of a solution of titanium tetrachloride in an inert solvent, preferably an alkylbenzene, the solvent containing 5% by weight or more of titanium tetrachloride. The product is then washed with a liquid alkane until the content of titanium tetrachloride in the washings is less than 2% by weight.

The titanium-containing solid component obtainable in this way is used with a cocatalyst as the Ziegler-Natta catalyst system. Suitable cocatalysts here are aluminum compounds and electron-donor compounds.

Suitable aluminum compounds are trialkylaluminum and compounds in which an alkyl has been replaced by alkoxy or halogen, for example by chlorine or bromine. Preference is given to trialkylaluminum compounds whose alkyl groups each have from 1 to 8 carbon atoms, for example trimethylaluminum, triethylaluminum or methyldiethylaluminum.

In addition to the aluminum compound, preference is given as a further cocatalyst to electron-donor compounds, such as monofunctional or polyfunctional carboxylic acids, carboxylic anhydrides and carboxylic esters, furthermore ketones, ethers, alcohols, lactones and organophosphorus and organosilicon compounds. Particularly preferred electron-donor compounds here are organosilicon compounds of the general formula III

  III where R$^1$ is identical or different C$_1$- to C$_{20}$-alkyl, 5- to 7-membered cycloalkyl, which may itself carry C$_1$- to C$_{10}$-alkyl, or C$_6$- to C$_{20}$-aryl or -arylalkyl, R$^2$ is identical or different C$_1$- to C$_{20}$-alkyl, and n is 1, 2 or 3. Particular preference is given to compounds in which R$^1$ is C$_1$- to C$_8$-alkyl or 5- to 7-membered cycloalkyl, R$^2$ is C$_1$- to C$_4$-alkyl, and n is 1 or 2.

Of these compounds, dimethoxydiisopropylsilane, dimethoxyisobutylisopropylsilane, dimethoxydiisobutylsilane, dimethoxydicyclopentylsilane and diethoxyisobutylisopropylsilane should be particularly emphasized.

Preference is given to catalyst systems in which the atomic ratio between aluminum from the aluminum compound and titanium from the titanium-containing solid component is from 1:1 to 800:1, in particular from 2:1 to 200:1, and the molar ratio between the aluminum compound and the electron-donor compound employed as cocatalyst is from 1:1 to 100:1, in particular from 2:1 to 80:1. The catalyst constituents may be introduced into the polymerization system individually in any desired sequence or as a mixture of the components.

Catalyst systems of this type can be used to prepare the polymer a) to be employed according to the invention. In a preferred preparation process, propylene is polymerized in a first step, and a mixture of propylene and one or more $C_2$–$C_{10}$-alk-1-enes is polymerized onto the resultant propylene homopolymer in a second step.

The polymerization of the propylene in the first step is carried out at from 20 to 40 bar, at from 60° to 90° C. and at a mean residence time of the reaction mixture of from 1 to 5 hours, preferably at from 20 to 35 bar, from 65° to 85° C. and at a mean residence time of from 1.5 to 4 hours. The reaction conditions are preferably selected in such a manner that from 0.05 to 2 kg, preferably from 0.1 to 1.5 kg, of polypropylene are formed per mmol of the aluminum component in the first polymerization step.

When the reaction is complete, this polypropylene is discharged from the first polymerization step together with the catalyst and transferred into the second polymerization step, where a mixture of propylene and one or more $C_2$–$C_{10}$-alk-1-enes is polymerized on. The pressure prevailing in the second polymerization step is 7 bar, preferably 10 bar, below that in the first polymerization step and is from 5 to 30 bar, preferably from 10 to 25 bar. The temperature is from 30° to 100° C., preferably from 35° to 80° C., and the mean residence time of the polymer is from 1 to 5 hours, preferably from 1.5 to 4 hours. In this second polymerization step, the ratio between the partial pressures of propylene and the copolymerized $C_2$–$C_{10}$-alk-1-enes is set at from 0.1:1 to 10:1. It should furthermore be ensured, through a suitable choice of the reaction parameters, that the weight ratio between the monomers reacted in the first and second polymerization steps is from 0.2:1 to 20:1, in particular from 0.4:1 to 15:1.

As a further constituent of the partially cross-linked polymer composition according to the invention, a random ethylene copolymer b containing from 5 to 20% by weight of copolymerized $C_3$–$C_{10}$-alk-1-enes and with a density at room temperature of from 0.89 to 0.925 g/cm$^3$, is used. Preference is given here to a random ethylene copolymer b) of this type which contains from 8 to 20% by weight of copolymerized $C_3$–$C_{10}$-alkenes. For the purposes of the present invention, $C_3$–$C_{10}$-alk-1-enes are, in particular, propylene, but-1-ene, pent-1-ene, hex-1-ene, hept-1-ene and oct-1-ene or mixtures of these comonomers, preference being given to propylene, but-1-ene, hex-1-ene and oct-1-ene.

Random ethylene copolymers of this type are prepared by polymerizing the comonomers under low pressure using metal-containing catalysts, for example titanium- and aluminum-containing Ziegler catalysts. The polymerization reaction can be carried out using the reactors which are customary in industry, for example stirred reactors, either in the gas phase, in solution or in a slurry. In a preferred process, the ethylene copolymer (b) employed according to the invention is prepared by gas-phase polymerization using a Ziegler catalyst at from 10 to 100 bar and from 30° to 100° C. and a mean residence time of from 0.5 to 5 hours. In this process, the ratio between the partial pressures of ethylene and the $C_3$–$C_{10}$-alk-1-enes is set at from 2:1 to 100:1.

In the preparation of the partially crosslinked polymer composition according to the invention, the polymer a) is reacted with the organosilane compound c), the latter causing partial crosslinking of the polymer mixture. The random ethylene copolymer b) also present in the partially crosslinked polymer composition according to the invention may be admixed with the polymer a) either before or after the reaction with the organosilane compound c).

The organosilane compound c) employed is a compound of the formula (I)

$$A_{4-n}SiR_n \qquad (I)$$

where A are identical or different acrylates, methacrylate or vinyl groups, R are identical or different $C_1$–$C_8$-alkoxy or $C_1$–$C_8$-acetoxy groups, and n is 1, 2 or 3. Preferred organosilane compounds c) are those in which R is a $C_1$–$C_8$-alkoxy group and n is 3. Of these compounds, 3-methylacryloxypropyltrimethoxysilane, vinyltrimethoxysilane and vinyltriethoxysilane should be particularly emphasized. In small amounts, esters of acrylic or methacrylic acid can be used as further crosslinking agents in addition to the organosilane compound c).

The partially crosslinked polymer composition according to the invention is obtainable by reacting a polymer mixture comprising the polymer a) and the random ethylene copolymer b) with the organosilane compound c) in the presence of a free-radical initiator and in the presence of a condensation catalyst at from 180° to 280° C., at from 1 to 100 bar and at a mean residence time of the reaction mixture of from 0.2 to 5 minutes. The reaction is preferably carried out at from 190° to 260° C., at from 1 to 50 bar and at a mean residence time of from 0.2 to 5 minutes. The reaction of the individual components is carried out in the apparatuses usually employed in plastics processing for combining materials, for example in drum mixers, mills, screw or disk extruders, roll mills or kneaders.

The free-radical initiator employed is preferably an organic peroxide or an azo compound. Preference is given to organic peroxide compounds which have a half value period of from 1 to 30 seconds at 210° C. Of these compounds, dicumyl peroxide, monocumyl tert-butyl peroxide, di(tert-butyl) peroxide, 2,5-dimethyl-2,5-di(-tert-butylperoxy)hexane and 2,5-dimethyl-2,5-di(tert-butylperoxy)-3-hexyne should be particularly emphasized.

Suitable condensation catalysts are, in particular, carboxylic acid salts of tin, iron, lead, zinc or titanium, the carboxylic acid salts of tin being preferred. Particularly suitable compounds are dibutyltin dilaurate, dibutyltin diacetate and dibutyltin octanoate. In addition, it is also possible to employ chelates of titanic acid or alkylamines. In order to accelerate the reaction of the polymer mixture with the organosilane compound c), water or a water-eliminating agent, for example a hydrate, can also be added to the reaction mixture.

In a preferred embodiment, the partially crosslinked polymer composition according to the invention contains, as a further constituent, a random propylene copolymer d) containing from 1 to 10% by weight of copolymerized $C_2$–$C_{10}$-alk-1-enes. Preference is given to a random propylene copolymer d) containing from 2 to 8% by weight of $C_2$–$C_{10}$-alk-1-enes. For the purposes of the present invention, $C_2$–$C_{10}$-alk-1-enes are, in particular, ethylene, but-1-ene, pent-1-ene, hex-1-ene, hept-1-ene and oct-1-ene, or mixtures of these comonomers, preference being given to ethylene and but-1-ene.

The preparation of a random propylene copolymer d) of this type can be carried out using the Ziegler-Natta catalysts which are conventional in polymerization technology, in the gas phase, in solution or in a slurry. Suitable reactors for these propylene copolymers d) include batch or continuous stirred reactors, it also being possible to employ a series of consecutive stirred reactors. The reactors contain a fixed bed of finely divided polymers, which is usually kept in motion by stirring. In a preferred preparation process, the random propylene copolymer d) is prepared by polymerizing propylene from the gas phase in a reactor together with the further $C_2$-$C_{10}$-alk-1-ene at from 20 to 40 bar, from 30° to 100° C. and at a mean residence time of from 1 to 5 hours using a Ziegler-Natta catalyst system, with the partial pressure ratio between propylene and $C_2$-$C_{10}$-alk-1-ene being set at from 5:1 to 100:1.

It may also be advisable to also add a rubber-like material e) having a Shore A hardness of from 40 to 90 (in accordance with DIN 53505) to the polymer mixture to be employed according to the invention. The Shore A hardness is determined via the depth of penetration of a truncated cone into the sample material. Examples of rubber-like materials e) include styrene-butadiene block copolymers, styrene-ethylene-butene terpolymers, acrylate rubbers, ethylene-propylene rubbers, ethylene-propylene-diene rubbers, isoprene rubbers, styrene-isoprene rubbers, polyisobutylene rubbers, ethylene-vinyl acetate copolymers, polyurethane rubbers, nitrile rubbers and natural rubbers. Preference is given to styrene-ethylene-butene terpolymers, ethylene-propylene rubbers, ethylene-propylene-diene rubbers, polyisobutylene rubbers and acrylate rubbers.

The rubber-like material e), like the random propylene copolymer d), can be admixed with polymer a) and the random ethylene copolymer b) either before or after the reaction with the organosilane compound c).

The polymer mixture present in the partially crosslinked polymer composition according to the invention preferably contains, based on 100 parts by weight, from 40 to 90 parts by weight of polymer a), from 5 to 60 parts by weight of random ethylene copolymer b), from 0 to 15 parts by weight of random propylene copolymer d) and from 0 to 35 parts by weight of rubber-like material e). A preferred polymer composition of this type comprises, based on 100 parts by weight, from 50 to 80 parts by weight of polymer a), from 5 to 25 parts by weight of random ethylene copolymer b), from 5 to 15 parts by weight of random propylene copolymer d) and from 5 to 25 parts by weight of rubber-like material e). In a possible preparation process, the individual constituents of the polymer mixture, i.e. a), b) and, if used, d) and e), are first combined in a mixing apparatus, for example an extruder or mill, and subsequently partially crosslinked by reacting with the organosilane compound c). In another preparation process, the polymer a) is first reacted with the organosilane compound c), and components b) and, if used, d) and e) are subsequently admixed.

The partially crosslinked polymer composition according to the invention is preferably prepared using, per 100 parts by weight of the polymer mixture, from 0.1 to 4 parts by weight of the organosilane compound c), from 0.001 to 2 parts by weight of the free-radical initiator and from 0.001 to 0.1 part by weight of the condensation catalyst. Partial crosslinking of the polymer mixture takes place.

The partially crosslinked polymer composition according to the invention has a melt flow index at 230° C. and a weight of 2.16 kg of from 0.01 to 10 g/10 min. The melt flow index corresponds to the amount of polymer pressed out of a tester standardized in accordance with DIN 53 735 within 10 minutes at 230° C. under a weight of 2.16 kg. Particular preference is given to partially crosslinked polymer compositions whose melt flow index at 230° C. and a weight of 2.16 kg is from 0.02 to 5 g/10 min. It may also contain a small amount of the additives which are customary in plastics technology, for example talc, carbon black or metal carbonates.

Through the choice of the specific constituents of the polymer mixture and the organosilane compound c), partially crosslinked polymer compositions which have, in particular, high dimensional stability, a tensile strength which is equal in all directions, and good processing properties are obtained. In addition, the partially crosslinked polymer compositions according to the invention are simple to obtain since both the introduction of the organosilane compound c) and the subsequent partial crosslinking can be carried out in one step.

Due to their relatively good processing properties, the partially crosslinked polymer compositions according to the invention are particularly suitable as materials for injection molding, blow molding, extrusion and production of foams. They can be used to produce moldings, films and coating materials.

EXAMPLES

Examples 1-5 and Comparative Examples A and B were carried out in a Werner und Pfleiderer twin-screw extruder having a length:diameter ratio of 33. The polymer mixture constituents a), b) and, if used, d) and e) used in these examples were first fed into the extruder as granules, melted therein and subsequently reacted with the organosilane compound c), the free-radical initiator and the condensation catalyst employed in each case. The organosilane compound c), the free-radical initiator and the condensation catalyst were introduced into the extruder in liquid form, i.e. with addition of solvents. The reaction of the organosilane compound c) with the polymer mixture was carried out in all examples at 220° C., at about 20 bar and at a mean residence time of at least 28 seconds.

Example 1

70 parts by weight of a propylene polymer comprising 55% by weight of propylene homopolymer and 45% by weight of propylene-ethylene copolymer [determined by extraction fractionation by the method of W. Holtrup, Makromol. Chem. 178 (1977), 2335] and having an ethylene content of 23% by weight, based on the total polymer [determined by infrared spectroscopy] and a melt flow index of 2.1 g/10 min [at 230° C. and 2.16 kg, in accordance with DIN 53 735] were mixed in a twin-screw extruder with 10 parts by weight of a random ethylene copolymer containing 16% by weight of copolymerized but-1-ene and having a melt flow index of 1.4 g/10 min [at 230° C. and 2.16 kg, in accordance with DIN 53 735] and a density of 0.9 g/cm$^3$ and with 20 parts by weight of an ethylene-propylene copolymer having a propylene content of 25% by weight, and having a melt flow index of 3 g/10 min [at 230° C. and 10 kg, in accordance with ASTM D 1238] and having a Shore A hardness of 84. 100 parts by weight of the polymer mixture obtained in this way were then reacted in the same twin-screw extruder with 0.31 part by weight of vinyltrimethoxysilane, 0.026 part by weight of 2,5-dimethyl-2,5-di(tert-butylperoxy)hexane and 0.018 part by weight of dibutyltin dilaurate.

An extruded film having a width of 420 mm and a thickness of 1.1 mm was produced from the resultant partially crosslinked polymer mixture by the cast film process at a material temperature of 230° C. and a material pressure of 60 bar. The melt flow index, the Shore D hardness and the residual elongation (measure of the dimensional stability) of the film are shown in Table 1 below.

Example 2

70 parts by weight of a propylene polymer comprising 55% by weight of propylene homopolymer and 45% by weight of propylene-ethylene copolymer and having an ethylene content of 23% by weight, based on the total polymer and a melt flow index of 2.1 g/10 min [at 230° C. and 2.16 kg, in accordance with DIN 53 735] were mixed in a twin-screw extruder with 10 parts by weight of a random ethylene copolymer containing 16% by weight of copolymerized but-1-ene and having a melt flow index of 1.4 g/10 min [at 230° C. and 2.16 kg, in accordance with DIN 53 735] and a density of 0.9 g/cm$^3$ and with 20 parts by weight of a copolymer comprising 81% by weight of ethylene and 19% by weight of butyl acrylate and having a melt flow index of 1.8 g/10 min [at 190° C. and 2.16 kg, in accordance with DIN 53 735] and having a Shore A hardness of 88. 100 parts by weight of the polymer mixture obtained in this way were then reacted in the same twin-screw extruder with 0.31 part by weight of vinyltrimethoxysilane, 0.026 part by weight of 2,5-dimethyl- 2,5-di(tert-butylperoxy)hexane and 0.018 part by weight of dibutyltin dilaurate and worked up as described for Example 1.

An extruded film having a width of 420 mm and a thickness of 1.1 mm was produced from the resultant partially crosslinked polymer mixture by the cast film process on a Feud flat film extrusion line at a material temperature of 227° C. and a material pressure of 55 bar. The melt flow index, the Shore D hardness and the residual elongation (measure of the dimensional stability) of the film are shown in Table 1 below.

Example 3

65 parts by weight of a propylene polymer comprising 55% by weight of propylene homopolymer and 45% by weight of propylene-ethylene copolymer and having an ethylene content of 23% by weight, based on the total polymer and a melt flow index of 2.1 g/10 min [at 230° C. and 2.16 kg, in accordance with DIN 53 735] were mixed in a twin-screw extruder with 25 parts by weight of a random ethylene copolymer containing 16% by weight of copolymerized but-1-ene and having a melt flow index of 1.4 g/10 min [at 230° C. and 2.16 kg, in accordance with DIN 53 735] and a density of 0.9 g/cm$^3$ and with 10 parts by weight of an ethylene-propylenediene rubber having a density of 0.98 g/cm$^3$ and Shore A hardness of 73. 100 parts by weight of the polymer mixture obtained in this way were then reacted in the same twin-screw extruder with 0.31 part by weight of vinyltrimethoysilane, 0.026 part by weight of 2,5-dimethyl-2,5-di(tert-butylperoxy)hexane and 0.018 part by weight of dibutyltin dilaurate and worked up as described for Example 1.

An extruded film having a width of 420 mm and a thickness of 1.1 mm was produced from the resultant partially crosslinked polymer mixture by the cast film process on a Feud flat film extrusion line at a material temperature of 227° C. and a material pressure of 55 bar. The melt flow index, the Shore D hardness and the residual elongation (measure of the dimensional stability) of the film are shown in Table 1 below.

Comparative Example A 100 parts by weight of a propylene polymer comprising 55% by weight of propylene homopolymer and 45% by weight of propylene-ethylene copolymer and having an ethylene content of 23% by weight, based on the total polymer, and a melt flow index of 2.1 g/10 min [at 230° C. and 2.16 kg, in accordance with DIN 53 735] were mixed in a twin-screw extruder with 0.45 part by weight of vinyltrimethoxysilane, 0.04 part by weight of 2,5-dimethyl-2,5-di(tert-butylperoxy)hexane and 0.025 part by weight of dibutyltin dilaurate, and the mixture was worked up as described for Example 1.

An extruded film having a width of 420 mm and a thickness of 1.1 mm was produced from the resultant polymer mixture by the cast film process on a Feud flat film extrusion line at a material temperature of 220° C. and a material pressure of 44 bar. The melt flow index, the Shore D hardness and the residual elongation (measure of the dimensional stability) of the film are shown in Table 1 below.

TABLE 1

|  | Examples | | | Comparative Example |
|---|---|---|---|---|
|  | 1 | 2 | 3 | A |
| Melt flow index$^{a)}$ [g/10 min] | 0.03 | 0.21 | 0.35 | 0.4 |
| Shore D hardness$^{b)}$ | 33 | 35 | 36 | 49 |
| Residual elongations$^{c)}$ [%] | 81 | 80 | 72 | 1.01 |

$^{a)}$In accordance with DIN 53 735, at 230° C. under a weight of 2.16 kg
$^{b)}$In accordance with DIN 53 505, method D, measurement of the depth of penetration of a cone into the sample material
$^{c)}$After 2 hours, measurement on film strips 15 mm wide and 160 mm long which have been elongated by 200% at a rate of 50 mm/min using a DIN 53 455 tensile It can be seen from the results in Table 1 that the partially crosslinked polymer compositions according to the invention have, in particular, better processing properties, i.e. greater softness (reduced Shore D hardness) and greater dimensional stability (reduced residual elongation), than the polymer obtained from the comparative experiment.

Example 4

55 parts by weight of the polymer obtained in Comparative Example A were mixed in a twin-screw extruder with 25 parts by weight of a random ethylene copolymer containing 16% by weight of copolymerized but-1-ene and having a density of 0.9 g/cm$^3$ and a melt flow index of 1.4 g/10 min [at 230° C. and 2.16 kg, in accordance with DIN 53 735], 10 parts by weight of a random propylene copolymer containing 4% by weight of copolymerized ethylene and 2% by weight of but-1-ene and having a melt flow index of 5 g/10 min [at 230° C. and 2.16 kg, in accordance with DIN 53 735], and 10 parts by weight of a styrene-ethylene-butene terpolymer having a melt flow index of 2.4 g/10 min [at 230° C. and 2.16 kg, in accordance with DIN 53 735] and a Shore A hardness of 75, and the mixture was worked up as described in Example 1. In addition, 0.25 part by weight of carbon black was added to each 100 parts by weight of the partially cross-linked polymer mixture.

An extruded film having a width of 420 mm and a thickness of 1.1 mm was produced from the resultant partially crosslinked polymer mixture by the cast film process on a Feud flat film extrusion line at a material temperature of 228° C. and a material pressure of 60 bar. The melt flow index and the relative differences with respect to the modulus of elasticity in tension, the yield stress and the tear strength of the film are shown in Table 2 below.

Example 5

55 parts by weight of propylene polymer comprising 55% by weight of propylene homopolymer and 45% by weight of propylene-ethylene copolymer and having an ethylene content of 23% by weight, based on the total polymer, and a melt flow index of 2.1 g/10 min [at 230° C. and 2.16 kg, in accordance with DIN 53 735] were mixed in a twin-screw extruder with 25 parts by weight of a random ethylene copolymer containing 16% by weight of copolymerized but-1-ene and having a density of 0.9 g/cm³ and a melt flow index of 1.4 g/10 min [at 230° C. and 2.16 kg, in accordance with DIN 53 735], 10 parts by weight of a random propylene copolymer containing 4% by weight of copolymerized ethylene and 2% by weight of butene and having a melt flow index of 5 g/10 min [at 230° C. and 2.16 kg, in accordance with DIN 53 735], and 10 parts by weight of a styrene-ethylene-butene terpolymer having a melt flow index of 2.4 g/10 min [at 230° C. and 2.16 kg, in accordance with DIN 53 735] and a Shore A hardness of 75. In addition 0.25 part by weight of carbon black was added to each 100 parts by weight of this polymer mixture. 100 parts by weight of the polymer mixture obtained in this way were then reacted in the same twin-screw extruder with 0.3 part by weight of vinyltrimethoxysilane, 0.03 part by weight of 2,5-dimethyl-2,5-di(tert-butylperoxy)hexane and 0.018 part by weight of dibutyltin dilaurate, and the mixture was worked up as described in Example 1.

An extruded film having a width of 420 mm and a thickness of 1.1 mm was produced from the resultant partially crosslinked polymer mixture by the cast film process on a Feud flat film extrusion line in a similar manner to the other examples. The melt flow index, the Shore D hardness and the relative differences with respect to the modulus of elasticity in tension, the yield stress and the tear strength of the film are shown in Table 2 below.

Comparative Example B 55 parts by weight of propylene copolymer comprising 55% by weight of propylene homopolymer and 45% by weight of propylene-ethylene copolymer and having an ethylene content of 23% by weight, based on the total polymer, and a melt flow index of 2.1 g/10 min [at 230° C. and 2.16 kg, in accordance with DIN 53 735] were mixed in a twin-screw extruder with 25 parts by weight of a random ethylene copolymer containing 16% by weight of copolymerized but-1-ene and having a density of 0.9 g/cm³ and a melt flow index of 1.4 g/10 min [at 230° C. and 2.16 kg, in accordance with DIN 53 735], 10 parts by weight of a random propylene copolymer containing 4% by weight of copolymerized ethylene and 2% by weight of 1-butene and having a melt flow index of 5 g/10 min [at 230° C. and 2.16 kg, in accordance with DIN 53 735], and 10 parts by weight of a styrene-ethylene-butene terpolymer having a melt flow index of 2.4 g/10 min [at 230° C. and 2.16 kg, in accordance with DIN 53 735] and a Shore A hardness of 75. In addition 0.25 part by weight of carbon black was added to each 100 parts by weight of this polymer mixture. The polymer mixture obtained in this way was worked up as described in Example 1 without addition of an organosilane compound c), a free-radical initiator or a condensation catalyst.

An extruded film having a width of 420 mm and a thickness of 1.1 mm was produced from the resultant partiallly crosslinked polymer mixture by the cast film process on a Feud flat film extrusion line at a material temperature of 235° C. and a material pressure of 74 bar. The melt flow index and the relative differences with respect to the modulus of elasticity in tension, the yield stress and the tear strength of the film are shown in Table 2 below.

TABLE 2

|  | Examples | | Comparative Example |
|---|---|---|---|
|  | 4 | 5 | B |
| Melt flow index[a] [g/10 min] | 0.4 | 1.0 | 1.7 |
| Relative difference (Δ) with respect to |  |  |  |
| Modulus of elasticity in tension[b] | 0.2 | 0.31 | 0.41 |
| Yield stress[c] | 0.05 | 0.07 | 0.14 |
| Tear strength[c] | 0.26 | 0.23 | 0.34 |

[a] In accordance with DIN 53 735, at 230° C. under a weight of 2.16 kg
[b] In accordance with DIN 53 457 using an S2 dumbbell test specimen, stamped from the film along and transverse to the extrusion direction, take-off rate 1 mm/min
[c] In accordance with DIN 53 455

The difference shown in Table 2 with respect to the modulus of elasticity in tension, yield stress and tear strength properties in all cases relates to differences in the measurement results in the longitudinal and transverse directions. This relative difference (Δ) is determined using the formula below:

$$\Delta = \frac{E_l - E_t}{E_l}$$

$E_l$: Property in the longitudinal direction of the film
$E_t$: Property in the transverse direction of the film Low relative differences (Δ) mean that the dimensional stability of the test specimens is substantially independent of direction.

As can be seen by comparing Examples 4 and 5 with Comparative Example B, the partially crosslinked polymer mixtures according to the invention have, in particular, a dimensional stability which is substantially constant in all directions.

We claim:

1. A partially crosslinked polymer composition having a degree of crosslinking such that the melt flow index at 230° C. and a weight of 2.16 kg is from 0.01 to 10 g/min., said composition comprising
   a) a polymer which is the result of a multi-step sequential polymerization reaction and comprises from 25 to 95% by weight of polypropylene and from 5 to 75% by weight of propylene copolymer with copolymerized $C_2$–$C_{10}$-alk-1-enes, the comonomer content being from 1 to 45% by weight, based on the total polymer,
   b) a random ethylene copolymer containing from 5 to 20% by weight of copolymerized $C_3$–$C_{10}$-alk-1-enes and having a density at room temperature of from 0.89 to 0.925 g/cm³, and
   c) an organosilane compound of the formula I

$$A_{4-n}SiR_n \qquad (I)$$

where A are identical or different acrylates or methacrylates or vinyl groups, R are identical or different $C_1$–$C_8$-alkoxy or $C_1$–$C_8$-acetoxy groups, and n is 1, 2 or 3, and obtained by reacting a polymer mixture of the polymer a) and the random ethylene copolymer b) with the organosilane compound c) in the presence of a free-radical initiator and in the presence of a condensation catalyst at from 180° to 280° C., at from 1 to 100 bar and at a mean residence time of the reaction mixture of from 0.2 to 10 minutes.

2. A partially crosslinked polymer composition as claimed in claim 1, which contains, as a further constituent, d) a random propylene copolymer containing from 1 to 10% by weight of copolymerized $C_2$–$C_{10}$-alk-1-enes.

3. A partially crosslinked polymer composition as claimed in claim 2 which contains, as a further constituent, e) a rubbery polymer material having a Shore A hardness of from 40 to 90.

4. A partially crosslinked polymer composition as claimed in claim 3, where the polymers a), b), d) and e) are used in the following ratio, based on 100 parts by weight:

from 40 to 90 parts by weight of polymer a)

from 5 to 60 parts by weight of the random ethylene copolymer b)

from 5 to 15 parts by weight of the random propylene copolymer d)

from 5 to 25 parts by weight of the rubbery polymer e).

5. A partially crosslinked polymer composition as claimed in claim 3, where from 0.1 to 4 parts by weight of the organosilane compound c) are used per 100 parts by weight of components a), b), d) and e).

6. A partially crosslinked polymer composition as claimed in claim 1, in whose organosilane compound c) R is $C_1$–$C_8$-alkoxy, and n is 3.

7. A molding produced from a partially crosslinked polymer composition as claimed in claim 1.

* * * * *